2 Sheets—Sheet 1.

J. D. BILLINGS.

Railroad Speed Register.

No. 27,664. Patented March 27, 1860.

Witnesses
J. Gibson
H. G. Cleak

Inventor
Joseph D. Billing

J. D. BILLINGS.
Railroad Speed Register.

No. 27,664.

2 Sheets—Sheet 2.

Patented March 27, 1860.

Fig. 3

Fig. 4

Witnesses
J. G. Lun
H. G. Clark

Inventor
Joseph D. Billings

UNITED STATES PATENT OFFICE.

JOSEPH D. BILLINGS, OF RUTLAND, VERMONT, ASSIGNOR TO HIMSELF, AND E. A. CHAPIN, OF KEENE, NEW HAMPSHIRE.

SPEED-REGISTER.

Specification of Letters Patent No. 27,664, dated March 27, 1860.

*To all whom it may concern:*

Be it known that I, JOSEPH D. BILLINGS, of Rutland, in the county of Rutland and State of Vermont, have invented a new and useful Register for Indicating the Speed of Railroad-Trains; and I do hereby declare that the following is a full, clear, and exact description thereof, reference being had to the accompanying drawings, forming a part of this specification, in which—

Figure 1:
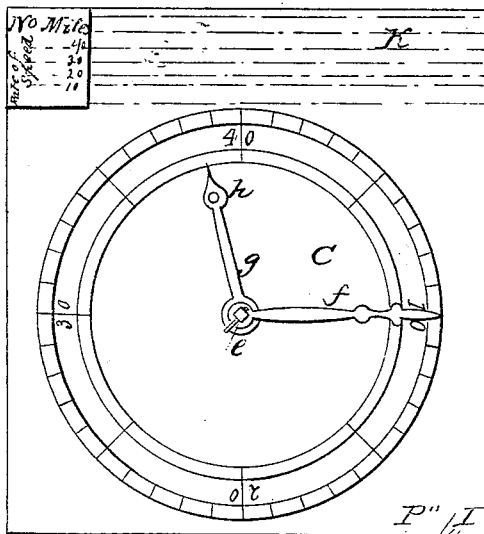
Figure 2:
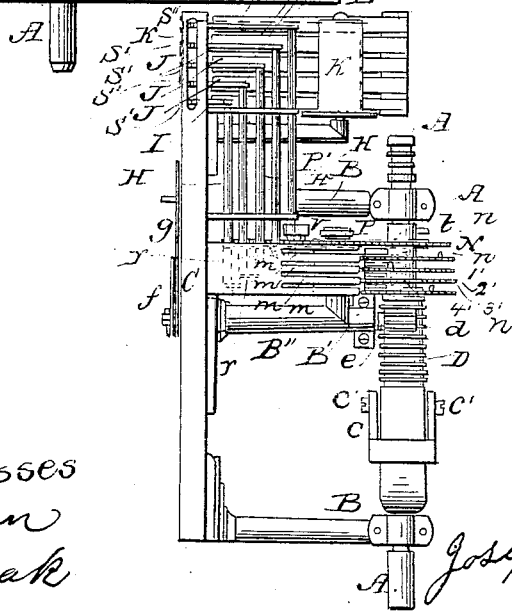

Figure 1 represents the dial plate from which the speed attained during any given distance may be accurately read off, also the number of miles run during a given time will be registered and may be read off from this dial plate. Fig. 2 represents a side elevation of the mechanism for registering speed and distance, which is to be inclosed in a tight case with a dial plate in front, covered with a glass plate. Fig. 3 is a back, view of the mechanism of Fig. 2 showing the several parts arranged in their relative position when they are at rest. Fig. 4 is a top or plan view of Figs. 2 and 3.

Similar characters of reference indicate corresponding parts in the several figures.

The object of this invention will be understood by the title, it being to arrange in a convenient situation about a rail road car, or the locomotive certain mechanism which receiving motion from an axle of the truck wheels, will register the number of miles traveled, and also the greatest speed attained in a given number of miles, and the speed of the train during any one of these miles.

My invention consists in the use of a ball governor of a peculiar construction which is operated by the axle of the truck wheels through the medium of a vertical shaft so as to rotate a circular rack to which is connected, by suitable gearing, index hands for registering the number of revolutions the governor is performing, or rather the rate of speed at which the train is traveling; connected with the circular rack and raising and lowering with it as the centrifugal action of the governor balls increases or diminishes, is a cam projection or striker which actuates a certain arrangement of levers and from these a rotary motion is imparted to a system of ratchet wheels, which, through the medium of spring points arranged in a suitable manner, indicate upon a slip of paper, by perforations, the rate of speed attained in each mile throughout the entire route. A striker upon the governor shaft fixed to and turning with it also indicates the miles traveled, by means of a lever and ratchet wheel similar to those for registering the speed of the train during any given distance. The entire mechanism excepting the governor shaft connecting with the axle of the car wheels is inclosed in a tight box with a glass face so that the superintendent can at any time know the rate of speed the train has traveled either for any one mile in the route or for any number of miles; the engineer or the conductor may also know at any time, by this machine how fast the train is moving, as will be hereinafter described.

To enable those skilled in the art to fully understand my invention I will proceed to describe its construction and operation.

The spindle or shaft, A, is connected by suitable gearing to any one of the car wheel axles, and receives its motion from said axle when the train is in motion. This shaft or spindle stands in a vertical position and has its upper bearings in two brackets, B B, which proceed out from and are perpendicular to the face of the index-board C; these brackets or supports project a sufficient distance from the back of board, C, to admit of the rotation of a peculiar governor, which revolves with the spindle, A. This governor is a simple and compact modification of the centrifugal governor, the balls, *a a*, instead of being suspended upon arms proportioned to the velocity an engine is required to move, are fitted to traverse from and toward their common center in the spindle, A, upon the curvilinear arms, *b b*, which revolve with the latter, these arms, or ball-rests, are formed into a cylindrical curve, which is determined in such a way that the horizontal plane of the rotation of the balls will vary with the varying speed of the train and the vertical motion thus generated is transferred directly to a circular rack, D. The balls are, for this purpose, hung by pins passing through their axes in slotted swinging bars, *c c*, and this bar is pivoted centrally to the rack, D, at *c'*. This governor will be made to form the subject of a separate application where it will be more minutely described.

The teeth of the circular rack, or sliding socket, D, engages with a pinion spur wheel, *d*, fixed to a stem, *e*, which latter is supported by a bracket, B′, and passes through the dial board, C, and moves the long hand, f, shown by Figs. 1, 2 and 3 from which movement the engineer or conductor of the train can ascertain at any time exactly the speed of the train as follows: The hand, f, may be set in the offset at ten miles per hour, or at the lowest speed the train moves which is marked on the dial plate. Now it will be understood that the action of the governor balls upon the circular rack, D, raises or depresses it according to the varying speed of the engine, and as it acts upon the stem of the long hand, f, through the medium of the spur wheel, d, this hand will move around the dial plate in exact proportion to the speed of the train, for instance, if the train is moving at the rate of ten miles per hour the hand, f, will remain at that point indicated upon the dial plate but if the motion of the train is accelerated the hand will move toward the mark indicating twenty miles per hour, and so on around to the highest speed attained during the journey. Another hand, g, is placed upon the stem, e, as shown clearly by Fig. 1, but this hand is capable of moving on the stem, it has a pin, h, projecting from it which is struck by the hand, f, (this latter hand being placed in front of hand, g). The object of this second hand, g, is to indicate the highest speed attained during the entire travel; for this purpose the two hands, f and g, are placed in the start together, or both pointing to the same figure, as for instance Fig. 10, indicating ten miles per hour. Now as the speed of the train is increased over ten miles per hour the hand, f, will strike the pin h, of hand, g, and force it around to a point indicating by it the highest speed attained, at which point the hand, g, will remain while the hand, f, will return or vibrate from point to point as the speed varies. These indications may be read off at any time without trouble.

On the top of rack, D, fixed to and partaking both of its rotary and vertical motion is a cam or striker, k, which acts upon a series of levers, 1, 2, 3, 4, alternately as the speed of the train increases, but one of these levers can be acted upon by the striker, k, at a time.

All the levers, 1, 2, 3, 4, have one common fulcrum, lettered, in Fig. 4, x, and are arranged in a box, E, fixed to the board, C. The ends of the levers pass through slots in the box, E, which keep them all in their relative position and place. The levers, 1, 2, 3, 4, have each a pushing rod or ratchets, l, jointed to their ends, which rods are acted upon by springs placed behind them so as to keep them always in a position to be forced back by the striker, k.

The horizontal wheels, 1′, 2′, 3′, 4′, have their bearings in the vertical stem of a bracket, B″, and their faces are separated from contact with each other by metal washers or collars placed between each. These wheels each have short studs or pins, n, projecting up from their upper surfaces. They also have spring catch pawls, m, which press against the serrated circumference of each wheel and prevent it moving backward, or in an opposite direction to that imparted to it by the levers and pawls above referred to.

H H are four vertical rods each having on its lower end a short arm, r, which projects out over the surface of the wheels, 1′, 2′, 3′, 4′, a suitable distance to be acted upon by the pins, n, as said wheels turn around; and on the upper ends of these vertical rods, H, are fixed arms I, I, I, I, which, as the rods, H, are respectively acted upon by the wheels, 1′, 2′, 3′, 4′, force back the spring points, s′ s′ s′ s′, each of which points are acted upon independently of the others. When these points are suddenly relieved by the arms, I, they are thrown forward by springs, J J J J, so as to perforate a strip of paper, K, indicated by red lines in the figures, which is wound from a spool, L, to a spool, L′, passing over the surface of the dial plate, as shown by Figs. 1 and 4, and moved by mechanism hereinafter described. Each perforation on the strip of paper, K, made by the points, s′, registers the speed traveled for each mile.

The next object is to register the miles traveled upon the same strip of paper by perforations at regular intervals apart so that a comparison of the speed marks may be made with the mile marks thus informing the superintendents at the termini of the road the rate of speed attained each mile over the entire road. For this purpose the motion required must be obtained direct from the spindle, A, and to this end I fix upon this spindle above the rack, D, and out of the way of its motion a striker, t, Figs. 2, 3 and 4, which acts upon a spring lever, p, and pawl, p′, and operates a wheel, N, of the same size and turning upon the same axis of the lower series, 1″, 2″, 3′, 4′, in the same manner as either one of the wheels, 1′, 2′, 3′, 4′, are operated; and at each rotation of the spindle the wheel, N, is forced forward a certain distance. This wheel, N, has a pin, v, projecting up from its surface, which at each revolution strikes and forces forward an arm, P, of a vertical rod, P′, carrying on its opposite end another arm, P″, which latter arm actuates a spring point, s″, so as to perforate the strip of paper, K, at each successive revolution of the wheel, N. At the same time the strip of paper is removed forward a certain distance by the action of a toe or lug, u, upon the rod, P′, on a spring rod, M, which rod carries a pawl, R, operating a ratchet wheel, R′, affixed to the spool, L′, thus as the rod, P′, is acted upon by wheel, N, the rod, M, will be forced forward so as to move the ratchet wheel, R′, and spool, L′, and with the spool the strip of paper, K, which is wound upon it from spool, L, after receiving the registered marks or perforations indicating miles, and the speed attained each one of these miles.

Having thus described my invention what I claim, and desire to secure by Letters Patent, is:—

1. The arrangement of the circular rack, D,—actuated by any suitable governor—pinion, $d$, stem, $e$, and index hands, $f$ $g$, the latter having a pin, $h$, projecting from it, by which it is moved over the surface of the dial plate when the same are combined in the manner and operated as set forth.

2. I claim in combination with the striker, $k$, on the rack, D, the levers, 1, 2, 3, 4, and pawls, $l$, ratchet wheels, 1′, 2′, 3′, 4′, (more or less as may be desired) with their pins, $u$, rods, H, with their arms the whole arranged and combined essentially as represented and described.

3. I claim the wheel, N, with its lever and pawl receiving a direct motion from the spindle, A, arranged in such a relation to the point or needle, $s''$, that said needle will register every mile passed over by the train of cars, as described, and in combination therewith I claim the spring rod, M, pawl, R, ratchet wheel, R′, and spool, L′, for moving the strip of paper, upon which the speed and miles are registered at each revolution of the wheel, N, all arranged in the manner and for the purposes herein set forth.

JOSEPH D. BILLINGS.

Witnesses:
    H. G. CLARK,
    I. GIBSON.